May 28, 1929.  A. ROUNSBORG ET AL  1,714,820
GATE
Filed June 9, 1928
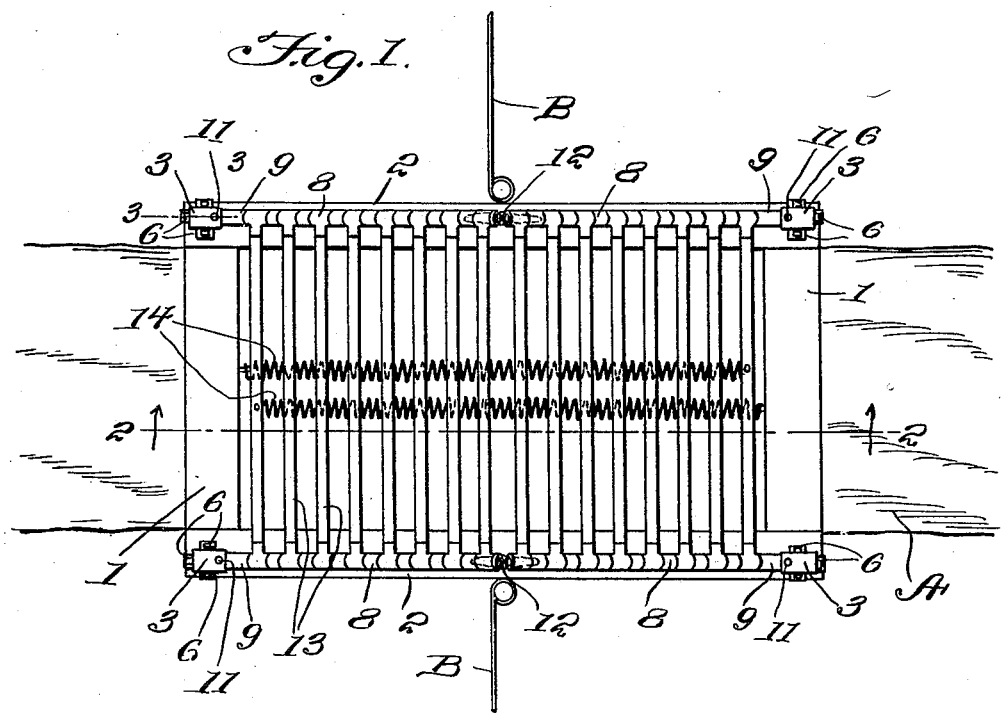
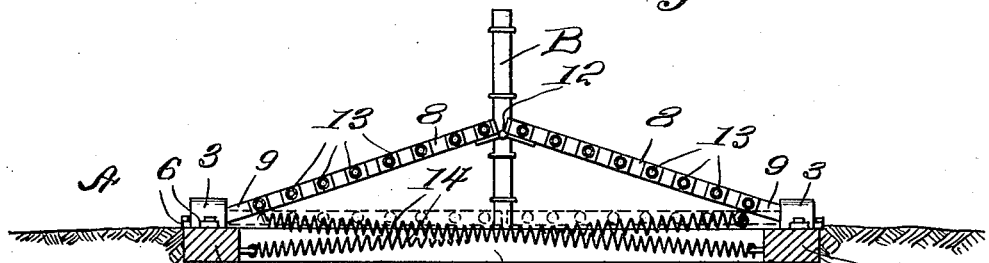
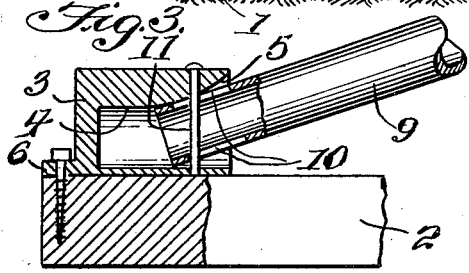
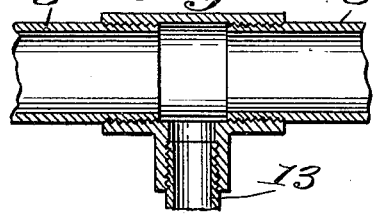
Anton Rounsborg
William Robb
INVENTOR
BY Victor J. Evans
ATTORNEY Patented May 28, 1929.

1,714,820

UNITED STATES PATENT OFFICE.

ANTON ROUNSBORG AND WILLIAM ROBB, OF BINGHAM, NEBRASKA.

GATE.

Application filed June 9, 1928. Serial No. 284,137.

This invention relates to gates, and its general object is to provide a gate that is normally held in a closed position to prevent the passage of cattle and the like, but is operable by a vehicle passing over the same for disposing it to an open position.

A further object of the invention is to provide a gate of the character set forth, that normally maintains itself in a closed position and is constructed in a manner to effectively prevent cattle and the like from endeavoring to operate the same due to fear of attempting to walk on the bridging structure thereof.

Another object of the invention is to provide a gate that is extremely simple in construction, inexpensive to manufacture and install and efficient in operation and service.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a top plan view of a gate constructed in accordance with our invention and showing the same in a fence line and a roadway.

Figure 2 is a sectional view taken approximately on line 2—2 of Figure 1 looking in the direction of the arrows.

Figure 3 is a sectional view taken approximately on line 3—3 of Figure 1.

Figure 4 is a sectional view taken through one of the joints for securing the cross members to the side members of our gate structure.

Referring to the drawings in detail, the latter A indicates a roadway and B a fence terminating upon opposite sides of the roadway and secured to posts as shown.

The gate includes a base made up of cross members 1 which are embedded in the roadway as best shown in Figure 2 of the drawings. Bridging these cross members and secured to the ends thereof in any appropriate manner are side members 2 extending longitudinally with respect to the road and having secured to their ends and rising from the upper surfaces thereof bearing blocks 3 each of which is provided with a recess 4, arranged therein in a manner to form a curved upper wall 5.

The bearing blocks are fixed to the side members through the medium of bolts passing through apertured ears 6 formed with said blocks and mounted in the recesses of the blocks are the outer ends of the sections which form the bridging structure for the gate. These sections are formed from pipes and pipe joints and each include side pieces 8 made up of relatively small pipe sections and T-joints as best shown in Figure 4 of the drawings. The end pipe sections of each of the side pieces are indicated by the reference numeral 9 and are formed with registering slots 10 adapted to accommodate pins 11 which bridge the recesses 4 of the bearing blocks and secure the sections thereto for movement in a manner which will be presently apparent.

The inner end of the side pieces are hingedly secured together by strip hinges 12 and secured to one of the arms of each of the T-joints are cross pieces 13 which as shown in Figure 4 are in reality pipes. These cross pieces due to the arrangement of the T-joints are disposed in equi-distantly spaced relation and are spaced a sufficient distance apart to prevent cattle and the like from attempting to operate the gate, but a vehicle is capable of passing across the hinged sections with very little difficulty.

Coil springs 14 are provided for normally retaining the hinged sections in their raised or operative position as best shown in Figure 2, and these springs have one of their ends secured to the cross members 1, while their opposite ends are secured to the outermost cross piece 13 of each hinge section as best shown in Figure 1.

From the above description and disclosure of the drawings, it will be obvious that due to the novel raised position of the gate as shown in Figure 2, cattle and the like will not attempt to operate the gate, but when the occupants of a vehicle desire to operate and cross the gate, pressure of the front wheels of the vehicle will cause the hinge sections to assume a position as shown in dotted lines in Figure 2, and when in this position, a vehicle can cross. When the vehicle has crossed the hinge sections, the coil springs 13 dispose the sections to their normal raised position as shown in full lines in Figure 2, with the result no manual operation of the gate is necessary and the occupants of the vehicle do not have to stop to open or close the same. When the gate is in its normal position, the hinge sections assume a position whereby these sections are disposed in converging relation with respect to each other.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

A gate of the character described comprising a base including cross members and side members embedded in a roadway with the cross members transversing said roadway, bearing blocks secured to the ends of said side members and being provided with recesses having curved upper walls, hinged sections including end pieces secured to said bearing blocks and mounted for slidable movement in the recesses thereof, cross pieces having their ends secured to the end pieces and being arranged in equidistantly spaced relation with respect to each other, coil springs having one of their ends secured to the cross members and their opposite ends to the outermost cross pieces and being adapted for normally retaining the hinged sections in converging relation.

In testimony whereof we affix our signatures.

ANTON ROUNSBORG.
WILLIAM ROBB.